United States Patent
Millsap et al.

(10) Patent No.: US 6,484,082 B1
(45) Date of Patent: Nov. 19, 2002

(54) IN-VEHICLE NETWORK MANAGEMENT USING VIRTUAL NETWORKS

(75) Inventors: Arnold W. Millsap, Leonard; Thomas Michael Forest, Southfield, both of MI (US); Peter H. G. Hansson, Grastorp (SE); Anthony Anderson, Warren; George D Nakis, Holly, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/578,213

(22) Filed: May 24, 2000

(51) Int. Cl.$^7$ ................................................ B60R 22/00
(52) U.S. Cl. .............................. 701/48; 701/33; 701/36; 701/49
(58) Field of Search ................................ 701/36, 48, 1; 340/438, 439, 825.22, 825.16, 825.06, 458, 462; 709/221, 224, 233, 245, 100, 106, 200, 201; 710/107, 110; 307/10.1, 9.1; 370/241, 242, 245, 254, 257; 702/182, 183

(56) References Cited

U.S. PATENT DOCUMENTS

| | | | |
|---|---|---|---|
| 4,715,031 A | * 12/1987 | Crawford et al. | 370/462 |
| 4,825,362 A | * 4/1989 | Minami et al. | 709/233 |
| 4,924,391 A | * 5/1990 | Hirano et al. | 701/33 |
| 5,046,041 A | * 9/1991 | Lecocq et al. | 710/42 |
| 5,132,905 A | * 7/1992 | Takai et al. | 701/33 |
| 5,467,272 A | * 11/1995 | Yoshida et al. | 701/1 |
| 5,483,230 A | * 1/1996 | Mueller | 340/825.06 |
| 5,486,817 A | * 1/1996 | Ina | 340/825.16 |
| 5,588,123 A | * 12/1996 | Loibl | 710/107 |
| 5,594,646 A | * 1/1997 | Itoh et al. | 701/35 |
| 5,659,702 A | * 8/1997 | Hashimoto et al. | 709/245 |
| 5,832,397 A | * 11/1998 | Yoshida et al. | 701/29 |
| 5,890,078 A | 3/1999 | Furuta | 701/1 |
| 6,052,632 A | * 4/2000 | Iihoshi et al. | 701/36 |
| 6,075,438 A | * 6/2000 | Abe et al. | 340/438 |

FOREIGN PATENT DOCUMENTS

| | | | | |
|---|---|---|---|---|
| DE | 19515194 A1 | * | 4/1996 | B60R/16/02 |
| JP | 2000006738 A | * | 1/2000 | B60R/16/02 |

* cited by examiner

Primary Examiner—Jacques H. Louis-Jacques
(74) Attorney, Agent, or Firm—Kathryn A. Marra

(57) ABSTRACT

A network management approach for use in a vehicle to control activation of electronic control units (ECUs) networked together throughout the vehicle. The ECUs are grouped together by function into virtual networks, with each virtual network including those ECUs used in carrying out a particular control task, such as controlling power windows or automatic headlights. The virtual networks are activated using a messaging protocol that specifies which virtual network is being activated. Periodic messages specifying the virtual network are also used to maintain it active. This permits the ECUs to be maintained in a low power quiescent state when the control functions are not needed, while allowing only those needed for a particular control task to be awakened and maintained in an activated state to carry out their associated control task. An ECU can activate one of the virtual networks by transmitting a wake-up signal followed by a message identifying the virtual network. Each of the ECUs receive this message and, if it is a member of the virtual network being initialized, maintains itself in an active state to carry out the control task associated with the virtual network. The other ECUs return to the quiescent state. Using this approach, an ECU is able to activate only the necessary ECUs for a particular control task without having to know which or how many ECUs are involved in performing the task.

34 Claims, 6 Drawing Sheets

IN-VEHICLE NETWORK MANAGEMENT USING VIRTUAL NETWORKS

TECHNICAL FIELD

The present invention relates to networks used in vehicles to provide distributed control of various vehicle functions and, more particularly, to such networks which utilize different groupings of electronic control units (ECUs) to carry out different control tasks.

BACKGROUND OF THE INVENTION

In contemporary vehicles, electronic control units (ECUs) are distributed throughout the vehicle to perform a variety of different vehicle functions. These vehicle functions can be operator-controlled or automated and are referred to herein generally as control tasks. These control tasks can include, for example, controlling vehicle door locks, seat position, cruise control, entertainment system devices (tuners, CD players, etc.), HVAC, intrusion alarms, interior and exterior lighting, electric window position, engine and vehicle system diagnostics, and, more recently, tasks such as seat heating and reverse sensing.

A common misconception is that each of the ECUs used in the vehicle is dedicated to a specific task. While some ECUs, including powertrain control modules and anti-lock brake system controllers, tend to be dedicated to a single control task, this is generally not the case for most other ECUs. Many control tasks are performed by several ECUs working in unison and coordinating their operation via a data link. A typical ECU may contain a portion of the control logic for several unrelated vehicle control tasks, and may not contain the complete control logic for any single control task.

The ECUs are typically connected together via one or more vehicle buses, which are generally implemented as serial communication buses in the form of a local area network. In addition to the basic mechanisms for transferring signals between ECUs over the vehicle bus, any reliable communication strategy must also ensure that a number of other ancillary tasks are performed. One of these tasks is called network management and is used to provide a system-wide common approach to handling such things as: orderly start up (activation) of communication capabilities; orderly shut down (deactivation) of communication capabilities; and predictable recovery from detectable communication errors.

Mechanisms to perform orderly start up and shut down are important so that ECUs can synchronize their signal reception expectations with the other ECUs signal transmission availability. If this synchronization does not occur, an ECU may interpret the lack of signal transmissions as the failure of one of the other ECUs and adopt safe default signal values that may be perceived by the occupant as improper vehicle operation. For example, headlights may default "on" if the day/night sensor signal is not transmitted in a timely manner.

Existing vehicle network management strategies are relatively simple. This simplicity stems from the fact that all ECUs in a vehicle are activated and deactivated simultaneously. As a result, the only complicating factor is that some ECUs may activate slower than others. There exists vehicle network schemes which permit an ECU to activate other ECUs, but not in a manner that is independent of vehicle platform and that allows multiple ECUs to activate the same collection of ECUs. Furthermore, they are not as responsive in the manner in which they perform their "on-demand" start-up operations. This severely reduces their effectiveness because the start-up process must be done quickly enough to keep the occupant from detecting delays following a button press that requires the ECUs to perform control operations. If this cannot be done, then the only other option is to keep the ECUs awake any time that an occupant may want to use their functionality.

The electrical power consumption in contemporary vehicles is approaching the limits for what can be economically provided by the existing vehicle electrical infrastructure. One method for reducing the consumption is to place ECUs that are not actively controlling vehicle functionality into a low power "standby", or "sleep" state. For example, window and seat control ECUs are used infrequently and can usually be placed in standby. From a network management perspective, vehicle systems with ECUs in standby introduce considerable complexity. In these systems, it is desirable to synchronize start up and shut down of arbitrary subsets of the vehicle's ECU population while letting other ECUs "sleep". Furthermore, a robust network design should be able to start ECU sets on demand without disrupting the control operations being performed by the ECUs which are already awake. Lastly, in order for an ECU to be used in multiple vehicle platforms, the ECU should be able to start up its signal providers even though the signals may be provided by different ECUs on each platform.

It is therefore a general object of this invention to provide an on-board vehicle network which utilizes a network management strategy that permits distributed ECUs on the network to activate other ECUs in a platform-independent manner using a common communication strategy which permits the ECUs to be maintained in a low power quiescent mode until needed.

SUMMARY OF THE INVENTION

The present invention provides an on-board vehicle network and method for operating the network which permits an ECU to activate the other ECUs used for a particular vehicle control task without having to know in advance what ECUs are utilized in performing the control task. The network comprises a plurality of on-board vehicle electronic control units (ECUs) connected together via at least one network bus, with the network being arranged into a plurality of virtual networks that each comprise a group of the ECUs that together perform a vehicle control task. Thus, the ECUs that together comprise a first one of the virtual networks are operable together to perform a first control task and are each identified using a first code that is associated with the first virtual network. Similarly, the ECUs that comprise the second virtual network are operable together to perform a second control task and are each identified using a second code that is associated with the second virtual network. The first and second virtual networks can be activated using respective first and second messages that they receive over the vehicle bus. Once activated a virtual network is then operable to perform its associated control task. Preferably, the messages include one or more of the codes used to identify the ECUs in a particular virtual network. In this way, an ECU can wake-up other ECUs out of their standby mode without having to know which ECUs are a part of the virtual network used to implement a particular control task.

In accordance with another aspect of the invention, there is provided a method of managing an on-board vehicle network that utilize ECUs that can be switched between and active state and a low power quiescent state. The network includes at least one group or subset of the ECUs on the network, with the group of ECUs being operable together to perform a particular vehicle control task. The method includes the steps of: receiving a signal request for activating a control task; waking up the ECUs out of the low power quiescent state; and sending a message to the ECUs that includes a code associated with the control task. This message is received by some or all of the ECUs in the network and, for each of these ECUs, if the code included with the message corresponds to a control task associated with the ECU, then the ECU enters into an active state in which the ECU is operable to perform the control task together with other ECUs associated with the control task. However, if the code included with the message does not correspond to a control task associated with the ECU, then it enters into the low power quiescent state.

If necessary, the messages to the ECUs can be preceded by a wake-up signal which switches all of the quiescent ECUs to the active state. Once the ECUs are awakened, they each monitor the network for receipt of a message containing a code associated with one of the control tasks for which they are used. If no code is received within a period of time following the wake-up signal, they switch back to their low power quiescent state. If a code is received, then each ECU checks to see whether it is associated with the received code; if so, it enters into a program mode in which it operates with the other appropriate ECUs to carry out the associated control task. If not, the ECU switches back to the quiescent state. In this way, any ECU on the network can be used to activate other ECUs associated with a particular control task, and can do so without having to know which or how many other ECUs are involved. This permits system designs in which a particular ECU can be used on different vehicle platforms, even if the function is performed differently on each platform.

BRIEF DESCRIPTION OF THE DRAWINGS

Preferred exemplary embodiments of the present invention will hereinafter be described in conjunction with the appended drawings, wherein like designations denote like elements, and.

DESCRIPTION OF THE PREFERRED EMBODIMENT

Figure 1:
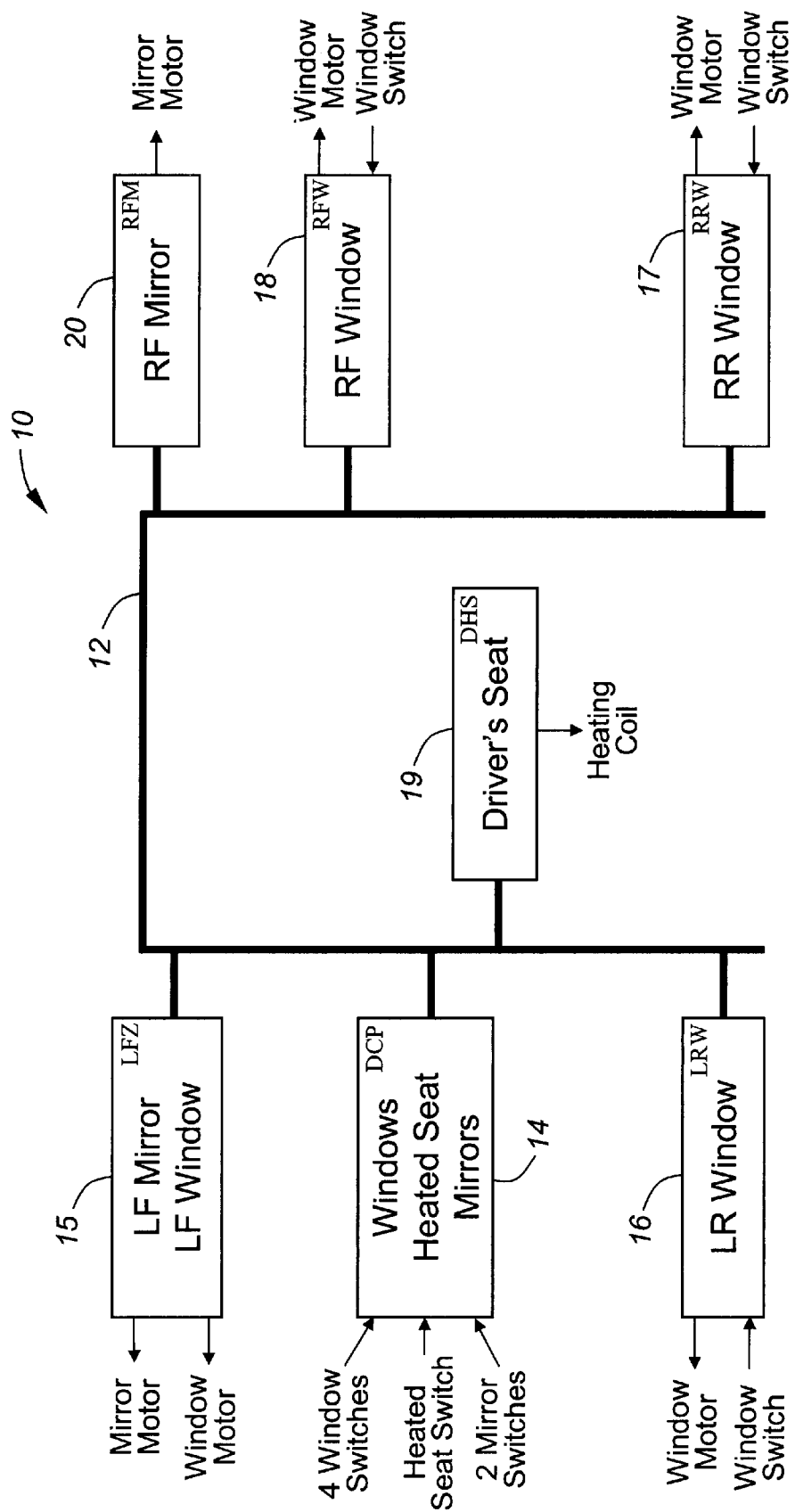
FIG. 1 is a block diagram showing the physical layout of a first exemplary on-board vehicle network of the present invention.

Referring first to FIG. 1, there is shown an on-board vehicle network 10 of the present invention. As in a conventional network design, the network 10 includes a number of electronic control units (ECUs) connected to each other by way of an in-vehicle network bus 12, which can be a serial communication bus or other suitable datalink. In particular, the illustrated network 10 includes a total of seven ECUs which support the following control tasks:

1. power windows—a given vehicle door window can be electrically operated by a switch at the door, and the driver can operate any of the (four) power windows from a cluster of switches at the driver's door;
2. heated driver's seat—the heating coil in the driver's seat can be turned on or off from a switch on the driver's switch cluster;
3. power mirrors—either of the two vehicle side mirrors can be moved by the driver using switches in the driver's switch cluster.

Neither the individual vehicle systems nor their sensors and actuators are illustrated; however, the design of such systems and integration with the distributed ECUs is well within the level of skill in the art. Also, it will be appreciated that the illustrated network is just a fragment of a typical on-board vehicle network and is shown for the purposes of illustrating the construction and operation of the present invention. Numerous other ECUs and control tasks could and normally would be included in the network shown in FIG. 1.

As depicted in FIG. 1, the network 10 includes the following ECUs. A driver's control panel (DCP) ECU 14 is used to manage the driver's switch bank that includes window, mirror and heated seat switches. A left front zone (LFZ) ECU 15 is used to manage the left front window and mirror motors. The remaining five modules are each dedicated to a single task. In particular, the left rear window (LRW) ECU 16, right rear window (RRW) ECU 17, and right front window (RFW) ECU 18 manage their corresponding window switches and motors. The driver's heated seat (DHS) ECU 19 manages the seat heating coil and the right front mirror (RFM) ECU 20 manages the corresponding mirror motor.

The following table lists the different ECUs and their associated vehicle functions (control tasks). As noted above, some of the ECUs are used to carry out more than one control task, whereas others are dedicated to a single task. Thus, for example, the driver control panel (DCP) ECU is used in performing all three control tasks, whereas the driver's heated seat (DHS) ECU is dedicated to warming of the driver's seat and does not play a role in any other vehicle function.

|     | Control Task |     |     |
| --- | --- | --- | --- |
| ECU | Power Windows | Heated Seat | Power Mirrors |
| LFZ | ✓ |  | ✓ |
| DCP | ✓ | ✓ | ✓ |
| DHS |  | ✓ |  |
| LRW | ✓ |  |  |
| RRW | ✓ |  |  |
| RFW | ✓ |  |  |
| RFM |  |  | ✓ |

Figure 2:
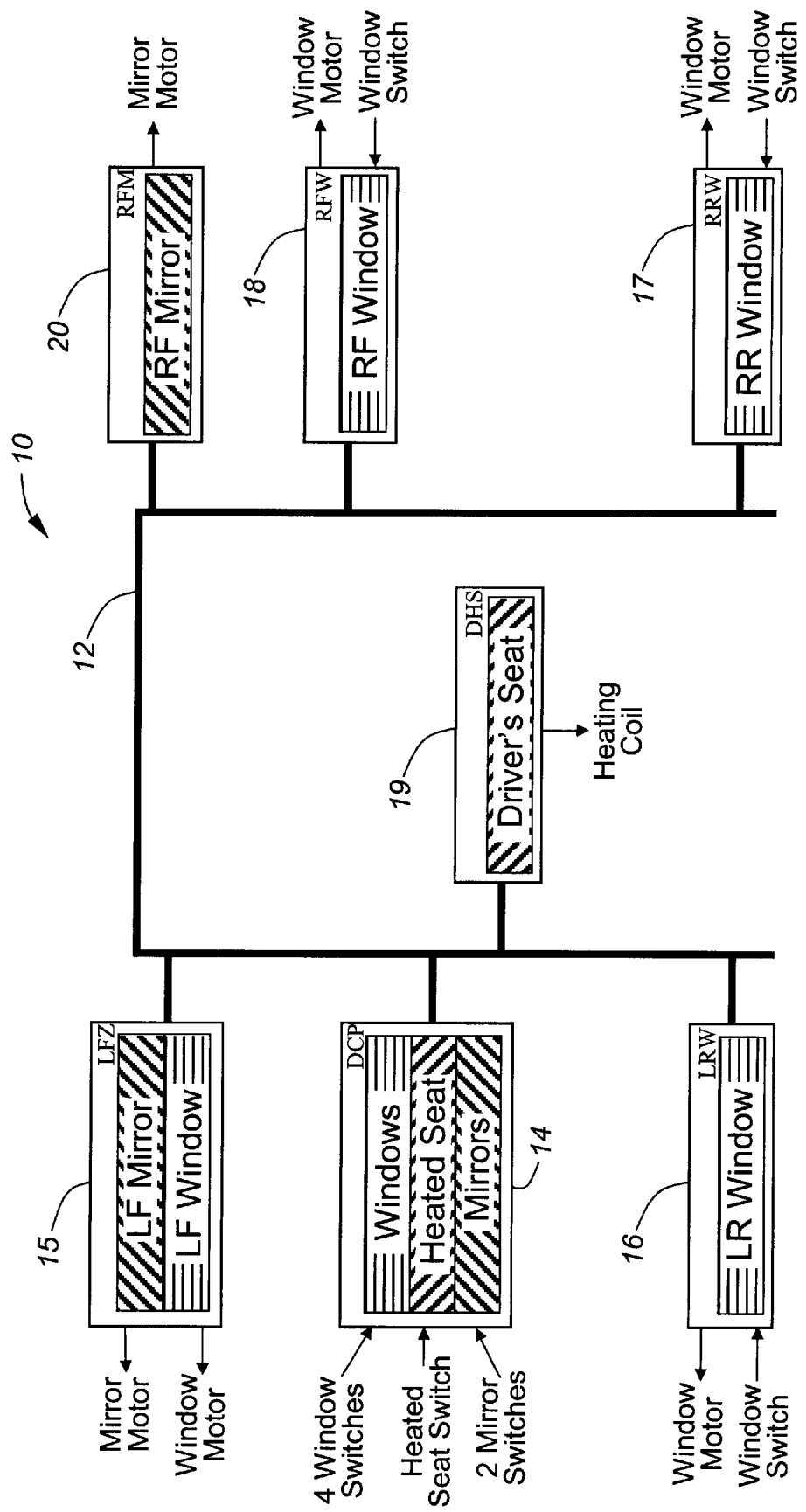
FIG. 2 is a block diagram of the network of FIG. 1 showing it organized into three virtual networks according to a preferred embodiment of the invention.

In accordance with one aspect of the invention, the illustrated ECUs 14–20 on network 10 are separated into three virtual networks—one for each of the three control tasks noted above. Thus, as shown in FIG. 2, the seven ECUs can be separated into a power windows virtual network 22, a heated seat virtual network 23, and a power mirrors virtual network 24. The window virtual network 22 includes the driver control panel ECU 14 as well as the four ECUs 15–18 used to control the motors for the four windows. The heated driver's seat virtual network 23 includes the driver control panel ECU 15 and driver's heated seat ECU 19. The power mirrors virtual network 24 includes the left front zone ECU 14, the driver control panel ECU 15, and the right front mirror ECU 20. A primary advantage of the separation of the network into these virtual networks according to the various control tasks is that the ECUs on the vehicle bus 12 can be maintained in a low power quiescent state when not in use and then only those ECUs needed for a particular control task need be woken up and maintained in an activated state.

For example, moving the left mirror requires communication between the driver control panel and left front zone ECUs because the mirror control switch is connected to the driver control panel ECU 14 while the left mirror motor is controlled by the left front zone ECU 15. Thus, a switch activation from the driver to move the left mirror is detected by driver control panel ECU 14, which activates the power mirror virtual network 24. This activation includes waking up the ECUs from their standby state (assuming some or all of them are not already awake and performing some other function) and then executing the appropriate control logic to perform the function. This control logic can be programmed into the various ECUs so that they communicate together properly to implement the particular control task—in this case, movement of the left mirror.

As another example, the control input for the driver's heated seat is to an ECU (the driver control panel ECU 14) that is different than the ECU used to activate the seat warmer (the driver's heated seat ECU 19). Thus, the heated seat virtual network 23 is activated whenever the appropriate switch on the driver's control panel is selected. The activation of a virtual network to perform a particular control task need not originate from one of the ECUs 14–20; rather, they can come from another source such as another ECU on the vehicle bus 12. An example of this is the use of yet another ECU (not shown) which is connected to receive inputs from the ignition system so that, upon detecting a personalized key unique to the driver, a signal is sent by this other ECU to ECUs 14, 15, and 20 to activate the mirror virtual network and move the mirrors to a preset position that has previously been stored in memory for this particular driver. In this example, the extra ECU would be included in the mirror virtual network 24. Similarly, activation of this virtual network to move the side mirrors to a preset position could come from yet another ECU not shown) that is part of a remote communication system that receives signals from a key fob or other remote transmitter.

In the network shown in FIG. 2, each of the three virtual networks is activated anytime one of its associated switch inputs is selected. Thus, for example, when the right front window switch is depressed, the window virtual network 22 is activated via the ECU 18 which senses the keypress. However, not all functions performed by a member of a virtual network require activating the virtual network. For example, the right front window ECU 18, although a part of the window virtual network 22 that includes five of the ECUs, may be implemented in a manner that does not require any network communication when the front right door window switch is activated, since both that switch and the associated right front window motor are controlled by the same ECU. Conversely, where the driver control panel (DCP) switch for the right front door window is depressed by the driver, different ECUs are used for detecting the switch event and activating the window motor. Accordingly, the window virtual network is activated, including both those ECUs used to accomplish the right front window control function and those ECUs in the virtual network (such as the left and right rear window ECUs) that are not involved in the particular window activation.

A significant advantage of this use of virtual networks is that the network management strategy permits the activation of the necessary ECUs to perform a control task without the various ECUs involved having to know which or how many other ECUs are required for the particular task. This permits the many control tasks to be implemented using multiple ECUs in a modular, distributed manner while allowing a greater degree of independence of the control logic for a particular ECU between different vehicle platforms. This aspect of the invention is discussed next.

The network management of the virtual networks 22–24 uses a messaging protocol over the vehicle bus 12 that permits all ECUs within a particular virtual network to be activated and maintained in an operational state until the associated control task is complete. The activation of the ECUs within a virtual network is typically initiated by one of the ECUs in the virtual network, although other triggers and sources can be used.

Figure 3:
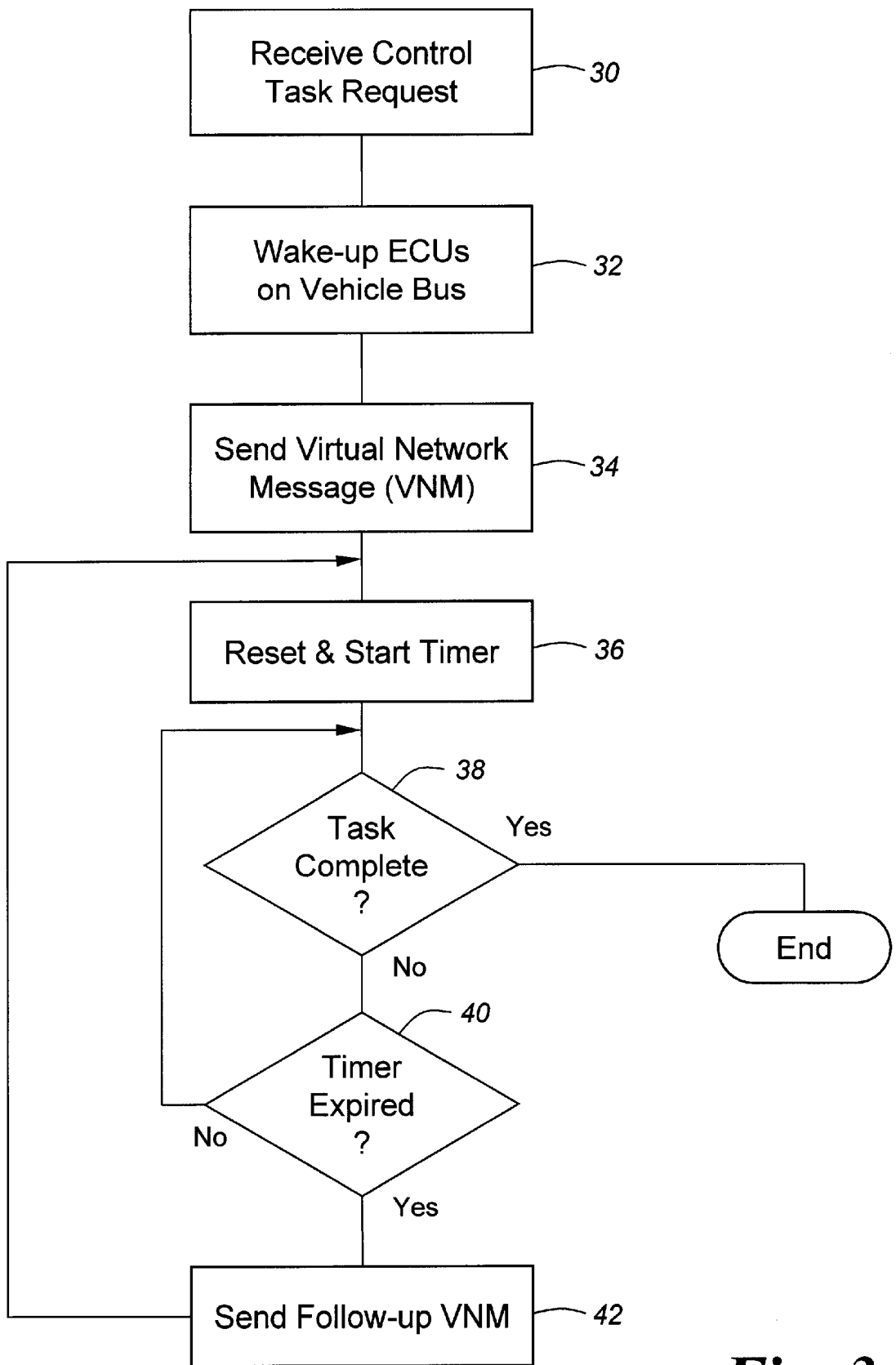
FIG. 3 is a flow chart showing the process carried out by an ECU to activate one of the virtual networks and maintain it active until its associated control task is complete.
Figure 4:
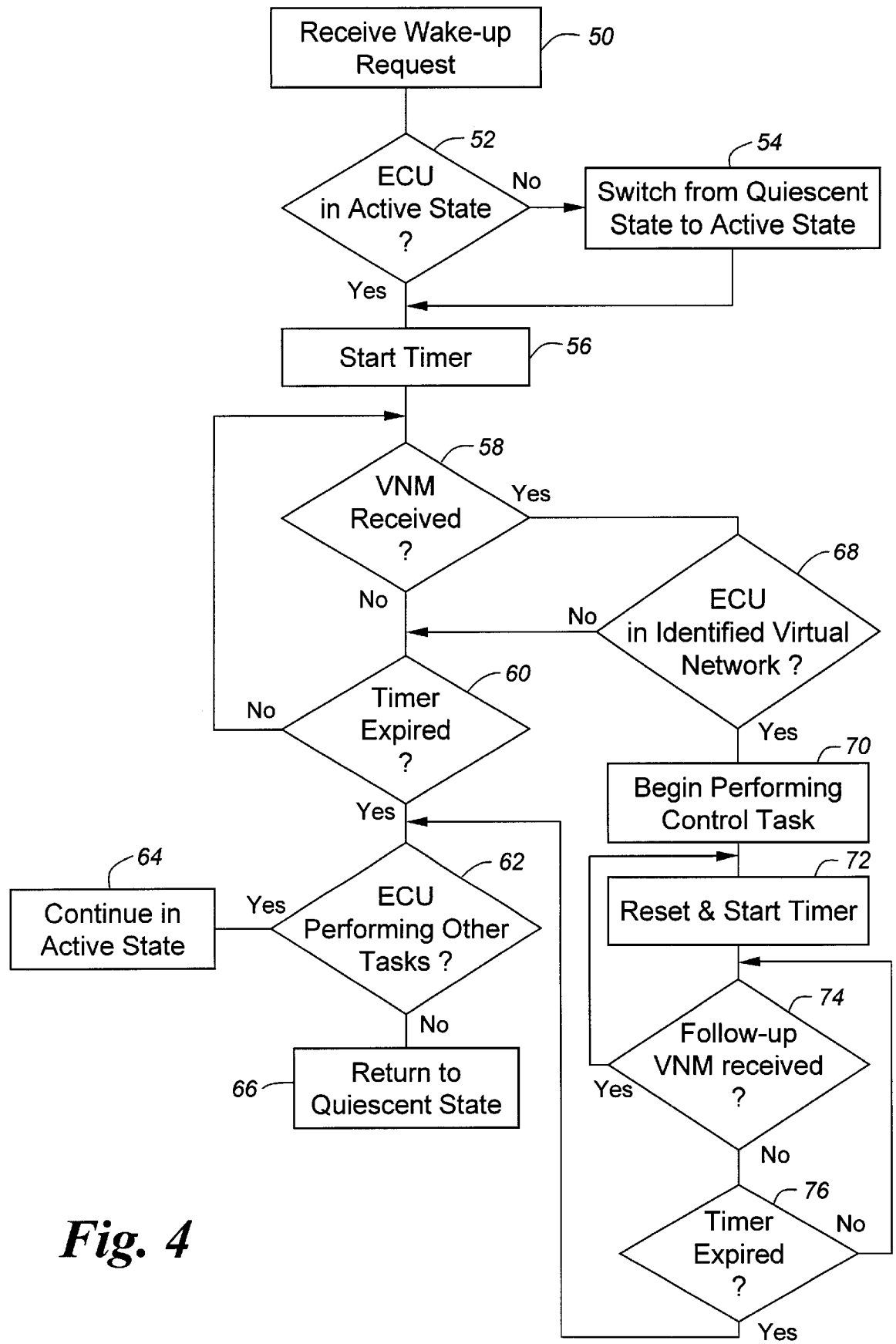
FIG. 4 is a flow chart showing the process carried out by each of the ECUs on the vehicle bus when one of the virtual networks is activated by another ECU on the bus.

A preferred method of activating one of the virtual networks is shown generally in FIG. 3 and the processing of wake-ups and messages relating to the virtual networks is shown in FIG. 4. In general, activation of a virtual network involves waking up the ECUs on the vehicle bus in response to a control task request (such as a button activation by the driver), sending a message over the bus to activate the virtual network associated with that control task, and then sending periodic messages to keep the ECUs in the virtual network active until the control task is complete.

More specifically, as indicated at block 30 of FIG. 3, the process begins upon receipt of a signal request to activate a control task. This signal request can originate from a switch activated by the driver or other vehicle occupant, or can be automatically generated either by a sensor or as the result of some vehicle software process. This request is received by one of the ECUs which responds at block 32 by sending a wake-up signal over the vehicle bus to the other ECUs. This wake-up signal can be a high-voltage wake-up as defined in SAE J2411 "Single Wire CAN Network for Vehicle Applications—Recommended Practice." The ECU that transmits the wake-up is considered the master ECU for this control event and is responsible for activating the virtual network associated with the requested control task. In this regard, different ECUs can simultaneously be the master for different, concurrent control tasks and a single ECU can be a master for more than one concurrent control task. For example, if the seat heater switch on the driver control panel is selected, the heated seat virtual network 23 is activated, with ECU 14 being the master. If, while the seat heating process is being carried out, the driver selects the front right door window switch, the window virtual network 22 is activated with ECU 18 being the master and the other ECUs on that virtual network being the slaves. Thus, ECU 14 would simultaneously be a master for purposes of the seat heating virtual network 23 and a slave for purposes of the window virtual network 22.

Returning back to the wake-up signal transmitted at block 32, those ECUs in the low power quiescent state respond to this wake-up signal by switching into an active state in which they begin monitoring the vehicle bus for messages, as will be described below in connection with FIG. 4. Next, the master ECU broadcasts a virtual network message (VNM) over the vehicle bus 12, as indicated at block 34. This VNM is used to identify the virtual network to be activated and, thus, the ECUs that should stay in the activated state to carry out the control task. All other ECUs not performing some other control task return to their sleep state. The master ECU then starts a countdown timer that can be set to, for example, three seconds. This is shown at block 36. Then, at block 38, a check is made to determine if the control task has been completed. If not, the process moves to block 40 where the timer is checked. If it has not yet expired, then the process returns to block 38 to again check whether the control task is complete. If the timer has expired, then the process moves to block 42 where a continuing, or follow-up, VNM is sent over the vehicle bus to indicate to the other ECUs in the virtual network that they should continue in the active state to continue performing the control task. The process flow then returns to block 36 to reset the timer and begin another iteration of this latter part of the process. Once the control task is complete, as determined at block 38, no more VNMs are sent in support of this virtual network and the process ends for this control task.

As will be appreciated, the timer is used to send periodic follow-up VNMs that notify other ECUs in the virtual network that the control task is not yet complete and that they should therefore remain in the active state to carry out their portion, if any, of the control task logic.

The process of FIG. 3 is that carried out by a master ECU to control the activation of one of the virtual networks. Turning now to FIG. 4, there is shown the process used by a slave ECU when a wake-up signal and VNM is received. Each of the ECUs is either operating in its quiescent state to conserve power or its active state in support of a control task. As indicated at locks 50, 52, and 54, upon receipt of a wake-up signal over the vehicle bus from a master ECU, each ECU on the vehicle bus is switched into its active state if not already operating in that state. Then, a count-down timer is started, as indicated at block 56. The purpose of this timer is to provide an eight second period of time during which the ECU monitors the bus for a VNM indicating which virtual network should be initiated. Note that this period of time is selected to be longer than the three second repeat rate of the timer used in FIG. 3 so that this timer should not expire as long as follow-up VNMs are being sent. Once the timer begins, a check is made at block 58 for receipt of a VNM. If no such message has been received, the process moves to block 60 where a check of the timer is made to determine if it has expired. If not, the process flow moves back to block 58 to again check for a VNM. The process of blocks 58 and 60 continue until either a VNM is received or the timer times out. If, at block 60, the timer does expire, a check is made to determine whether the ECU is performing any other task for which it should stay awake. This is shown at block 62. If other operations are being performed by the ECU, then the ECU is continued in its active state to carry out those other operations, as indicated at block 64. If no such tasks are being carried out, then the process flow instead moves to block 66 where the ECU is returned to its low power quiescent state.

If, at block 58, a VNM is received, then a check is made at block 68 to determine whether the virtual network identified in the message is one in which the ECU is a part. As will be discussed below in connection with FIG. 5, this identification can be accomplished using a code within the message that is unique to the virtual network. If the ECU is not part of the virtual network identified by the code, then the process moves back to block 60 to check the eight second timer and either continue monitoring for additional VNMs at block 58 or exit out of the loop by way of block 62, as appropriate. If the ECU is within the identified virtual network, then the process moves to block 70 where the ECU along with all others in that virtual network are switched into an operational mode in which they work together to perform the control task associated with the virtual network. A count-down timer is also begun at block 72. This timer can be the same as that used at block 60. Next, at block 74, a check is made to determine if a follow-up VNM has been received. If so, then the virtual network is to remain active and the process returns to block 72 to reset and restart the timer. If no VNM has been received, the timer is checked at block 76 to determine whether it has expired. If the timer has expired, then the virtual network is no longer active and the process moves to block 62 to determine the appropriate ECU state of operation. If the timer has not yet expired, the process returns to block 74 to continue monitoring for a proper VNM. It will of course be appreciated that this timer, as well as all others mentioned herein, can be implemented in software by the ECU itself.

To provide an entirely consistent approach to the virtual network messaging used over the vehicle bus, each ECU responds in exactly the same manner to wake-up requests and VNMs, regardless of whether it is a master ECU or slave ECU, or both. Thus, each master ECU responds as a slave to its own broadcasted VNM according to the process of FIG. 4, even though it was the initiator of that message. Furthermore, a single virtual network need not only have one master at a time. Rather, each triggering event (such as a switch activation by a passenger) can begin a virtual network and maintain it active until the function has been performed to completion. Thus, for example, if the rear right window switch is activated by a passenger, the window virtual network 22 is activated with ECU 17 being the master and therefore sending an initializing VNM as well as follow-up (continuing) VNMs. If, while that virtual network is active, the driver selects the left front window switch on the driver control panel, then ECU 14 also sends an initializing VNM as well as follow-up VNMs. Each master continues sending these VNMs until its associated task is complete. In this way, each master ECU maintains the virtual network active as long as it is needed. Thus, from a network management viewpoint, the completion of one task has no effect on the performance of another, since each master ECU maintains the virtual network active independently of the other.

Figure 5:
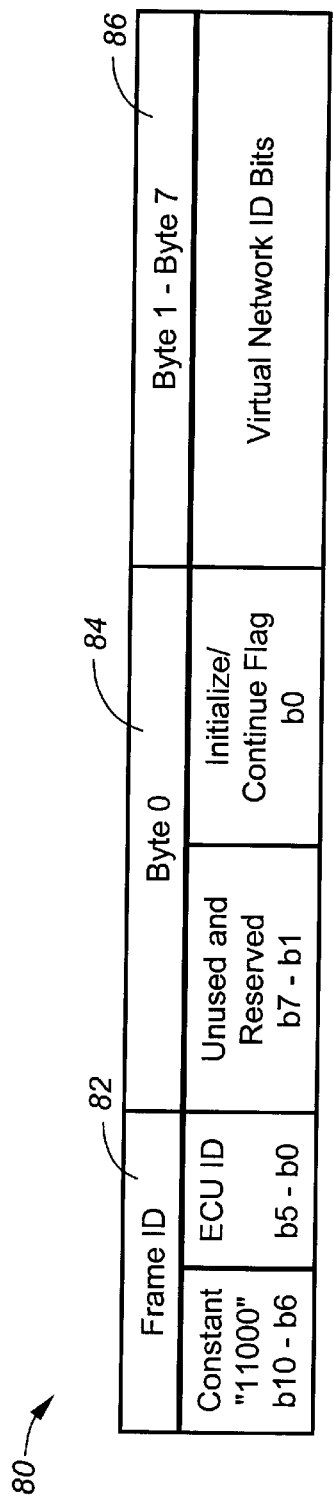
FIG. 5 depicts the layout of the messages used to activate the virtual networks of FIG. 2.

Turning now to FIG. 5, the format of the virtual network message (VNM) will now be described. These messages are transmitted as a frame 80 that includes a header 82, an initial byte 84 that identifies the message type, and seven network identifier bytes 86 that are used to identify the virtual network being activated by the message. Header 80 provides a frame ID that is separated into two parts: the first part is a fixed bit pattern ('11000' in the illustrated embodiment) that identifies the message as a VNM, and the second part is an ECU ID, which is unique to each ECU and is used to identify which ECU is transmitting the message. The fixed bit pattern comprises the five high-order bits (b6–b10) of the frame ID 82 and can be used to facilitate filtering of the messages by the ECUs. The ECU ID comprises the low-order six bits (b0–b5) of the frame ID and permits the unique identification of up to sixty-four different ECUs. The message type byte 84 comprises byte0 of the message data. It includes a low-order bit (b0) that is used as a flag to indicate whether the VNM is an initial VNM (that is used to initiate the virtual network) or a follow-up VNM (that is used maintain the virtual network active). The higher order bits of byte0 can be used for additional flags are data, as desired. The remaining seven bytes (byte1–byte7) are virtual network ID bits which uniquely identify one or more virtual networks. Each virtual network ID is in the form of a code that is unique to that virtual network and that is therefore uniquely associated with the control task for which that virtual network exists. Since the seven bytes provide up to 56 bits, each bit position can correspond to a different one of the virtual networks, with a zero (cleared bit) indicating that the virtual network associated with that bit position is not being activated by the message and a one (set bit) indicating that it is. Thus, the code for a particular virtual network can comprise a single bit located in a selected position within the VNM. This use of bit positions rather than sequential binary numbers to identify the different virtual networks allows an ECU that is currently the master of multiple virtual networks to send a single VNM that operates to maintain all of those virtual networks active. These assigned bit positions can also be used to simplify the processing required by each ECU to determine whether it is a part of the virtual network being activated. One or more of the bits in these seven bytes can be reserved for designating a common virtual network used on different vehicle platforms, such as a diagnostics virtual network.

As will be appreciated, by using the frame format discussed above for the VNMs, each message includes the information necessary to: differentiate it from other messages; identify the ECU from which the message originates; identify the type of message; and identify the virtual network(s) for which initial or continued activation is being requested.

Now that the basic operating process for both the master and slave ECUs have been defined, along with the format of the VNMs, the following example depicts the complete process of activating one of the virtual networks of FIG. 2, maintaining it active until its associated control task is complete, and then deactivating the network. In this example, operation of the heated seat virtual network will be described as it would occur in response to activation of the heated seat switch by the driver on the driver control panel, with the starting assumption being that all of the ECUs are asleep when the driver switches on the seat heater. It will of course be understood that activation of the virtual network could also be the result of some automated system, rather than by the driver, such as by way of another ECU that switches on the seat heater automatically when the vehicle ignition is turned on during cold ambient temperatures.

1. The driver control panel (DCP) ECU 14 senses that the heated seat switch has been turned to the "on" position. It immediately transmits a wake-up message.
2. All seven ECUs wake up in response to the wake-up message and place themselves in a state that will allow themselves to receive transmitted VNMs for the next eight seconds. Further wake-ups can be inhibited for a period of time (e.g., five seconds) since all ECUs are now awake for eight seconds.
3. After a short delay to allow the other ECUs to wake up, the DCP ECU 14 broadcasts a VNM containing the proper code to indicate that the heated seat virtual network 23 is to be initialized.
4. The driver's heated seat (DHS) ECU 19 receives the VNM and:
   a. Determines that the heated seat virtual network being initialized is a virtual network of which the DHS ECU 19 is a member;
   b. Enables the communication capabilities necessary to support the virtual network; and
   c. Starts the eight second timer to inhibit deactivation of these capabilities until the DCP ECU 14 stops transmitting VNMs and the timer expires.
5. Simultaneously, the DCP ECU 14 reacts to its own VNM transmission precisely as the DHS ECU 19 did—by performing steps 4(*a*)–(*c*).
6. The other five ECUs also receive the VNM and:
   a. Determine that the virtual network being initialized is a virtual network of which the they are not a member; and
   b. Until the timer used in step 2 above expires, they continue to wait to see if a VNM is broadcast which activates a virtual network of which they are a member.
   c. After expiration of the timer, they return to the low power quiescent state unless they are processing other tasks.
7. With the communication capabilities of the DCP and DHS ECUs enabled, the necessary communication for performing the control task (heating the seat) proceeds.
8. While the control task proceeds, the DCP ECU 14 broadcasts a VNM every three seconds to notify the members of the virtual network that the virtual network's communication capabilities need to be continued. With every VNM transmission by the DCP ECU 14:
   a. The DHS ECU 19 resets the timer which inhibits deactivation of the supporting communication capabilities for another eight seconds; and
   b. The DCP ECU 14 reacts to its own VNM transmission precisely as the DHS ECU does—by resetting its eight second timer.
9. When the DCP ECU 14 is done controlling the heated seat, it stops transmitting the VNM containing the data which maintains the heated seat virtual network active. Then:
   a. After eight seconds, the timer inhibiting deactivation of the communication capabilities on the DHS ECU 19 expires. The DHS ECU goes back to sleep.
   b. After this same eight seconds, the timer inhibiting deactivation of the communication capabilities on the DCP ECU 14 expires. The DCP ECU goes back to sleep.

The ability to wake-up and maintain only a subset of the ECUs in an active state to carry out a control task is advantageous because it helps limit the amount of time the ECUs are operating in the higher current active state. This is especially true for ECUs such as the DHS ECU 19 which only needs to be activated on the infrequent occurrence of a request for warming the driver's seat. This power savings can be significant, especially given the increasing loads placed on vehicle batteries and the electrical system infrastructure. For a vehicle with forty such ECUs operating at 100 mA each, and assuming 25% of them are able to be kept in their quiescent state at any one time, that provides a reduction of 40×0.25×100 mA=1 Amp of current. This is also significant from an economic point of view, as power used by the a typical vehicle today is estimated to cost between seven and nine dollars per amp.

There are a number of other advantages of the invention that should now be evident. For example, the network management approach used with these virtual networks allows ECUs to be developed for certain control tasks in a manner that can be independent of the vehicle platform. It also enables independent design of many of the ECUs since they do not have to know what other ECUs are included on the vehicle bus to carry out their assigned task; rather, they simply need to be programmed with their portion of the control logic for each task and must know what inputs to receive and what outputs to provide. This helps reduce ECU development time, since they can be developed more independently of each other. The network management approach discussed above also provides a more orderly start-up and shut-down of the ECUs than exists in many of the conventional network designs.

Figure 6:
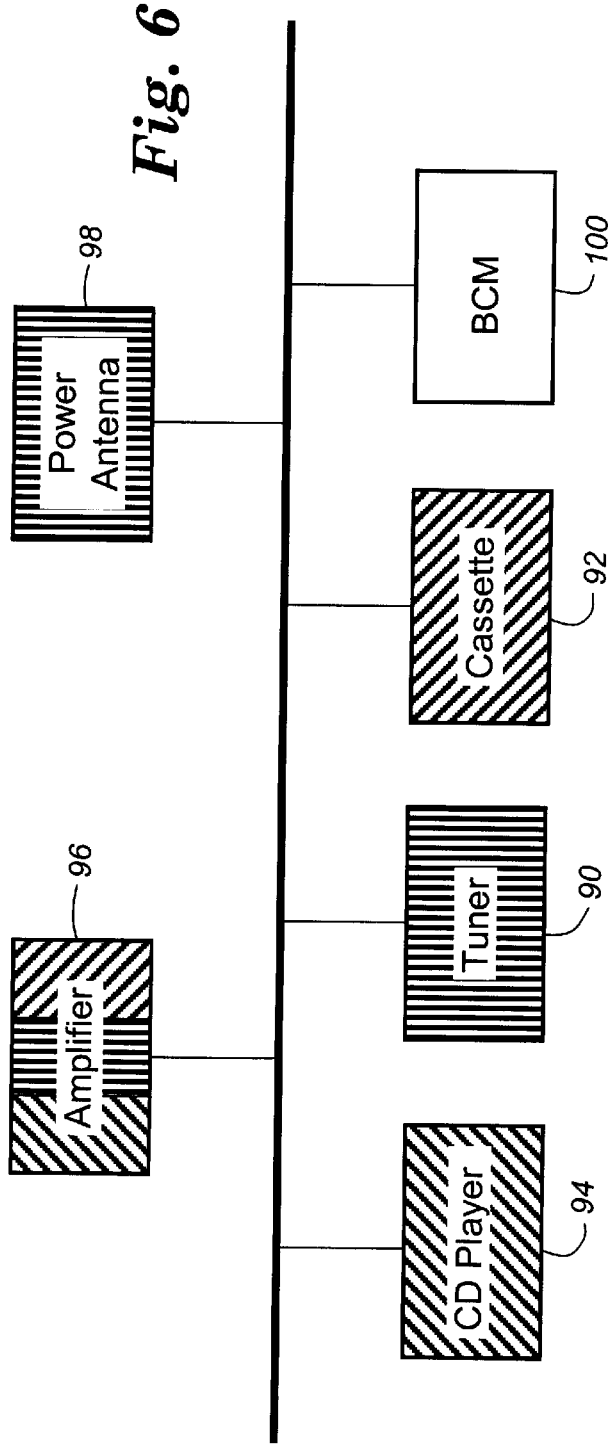
FIG. 6 is a block diagram showing a second exemplary on-board vehicle network of the present invention organized into three virtual networks.

Referring now to FIG. 6, there is depicted a second physical network fragment for an entertainment subsystem for a vehicle. The entertainment system is designed to support a tuner AM/FM reception, a cassette tape player, and a CD player, as represented by their respective ECUs 90, 92, and 94. Each of these ECUs are connected to the vehicle bus 12 along with an ECU 96 for an audio amplifier, and an ECU 98 for a power antenna. As will be appreciated, the vehicle bus 12 includes additional ECUs for other vehicle systems and functions, including, for example, a body control module (BCM) 100, as well as the ECUs of FIGS. 1 and 2. The entertainment subsystem is separated into three virtual networks—one for radio, one for the tape player, and one for the CD player. The radio virtual network includes the tuner, amplifier, and antenna ECUs (i.e., ECUs 90, 96, and 98). The cassette virtual network includes the cassette ECU 92 and amplifier ECU 96. The CD player virtual network includes the CD player ECU 94 and the amplifier ECU 96.

By organizing the ECUs of the entertainment subsystem into the virtual networks in this manner, the development, integration, and operation of the ECUs that are dedicated to one audio media can be decoupled from those dedicated to another of the audio media. For example, whereas a conventional network management technique for these entertainment ECUs would operate by starting up and shutting down all of the ECUs together, the use of virtual networks as shown in FIG. 6 permits the CD Player virtual network to activate ECUs 94 and 96 only. Thus, ECUs 90, 92, and 98 can all be allowed to sleep while the vehicle CD player is utilized, thereby reducing overall power consumption. Furthermore, by including support in the logic of ECU 96 for each of the different potential audio sources, any of the sources can be simply included or excluded without affecting the other ECUs in the entertainment subsystem. Thus, for example, by designing CD player virtual network support into the amplifier ECU 96, a CD player and its ECU 94 can be added if desired to a particular vehicle without requiring a change in any of the other ECUs. In this regard, other independent integrations are possible as well. For example, the tuner ECU 90 could be integrated in with the amplifier ECU 96 into a single ECU that performs both functions and this integration can be accomplished without affecting the cassette or CD player ECUs 92, 94 or their associated virtual networks.

Although the entertainment subsystem of FIG. 6 is arranged into three virtual networks, it will be appreciated that it could be implemented as a single virtual network if desired. In this regard, it will be understood that, as used herein, the term "control task" encompasses different vehicle functions at many different levels of generality and specificity. Thus, for the entertainment subsystem, a control task could be generally defined as controlling the vehicle audio entertainment system (using a single virtual network) or could be divided into more specific tasks, such as controlling the tuner, cassette player, or CD player (using three separate virtual networks).

The discussion thus far has been directed to use of the invention in connection with a single physical bus. However, the invention can also be used in conjunction with multiple on-board vehicle buses. Operator-controlled functions of the type discussed above in connection with FIGS. 1, 2, and 6 are typically implemented on a low-speed bus where system response time requirements are on the order of 100–200 msec. The vehicle might also include a high-speed bus for use in sharing real time data such as driver-commanded torque, actual engine torque, steering angle, and so forth. A mid-speed bus might also be included for advanced information and entertainment purposes, such as where large amounts of data must be transmitted in a relatively short time, as in, for example, advanced display or navigation systems. There may also be third-party networks on-board, as well as wireless connections to other, remote networks, such as the OnStar™ system available with many of the vehicles sold by General Motors Corporation.

Figure 7:
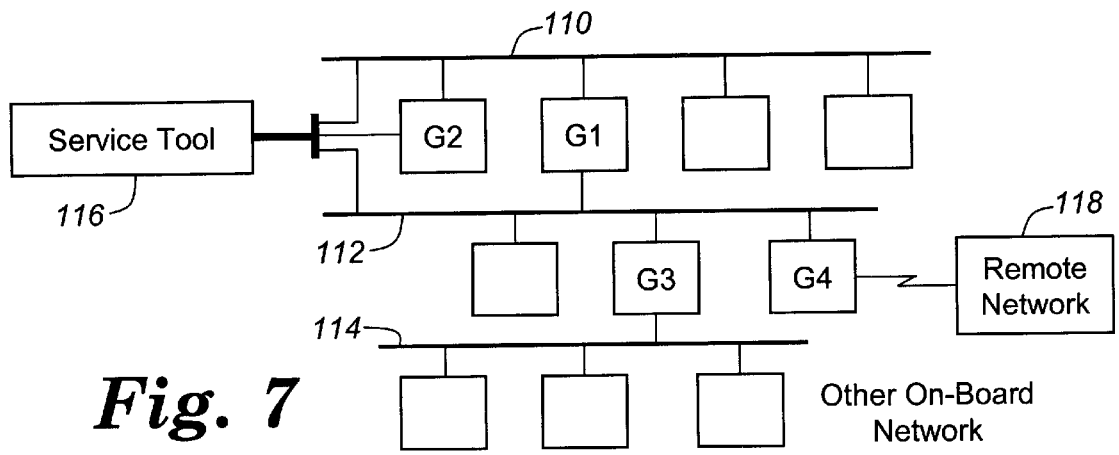
FIG. 7 is a block diagram showing the use of gateways to provide communication access from the network of FIG. 2 to other on-board and remote networks.

In some instances, different ECUs involved in carrying out a particular control task may be physically located on different buses or networks. Thus, as shown in FIG. 7, gateways are used to interface between these different buses so that the wake-up signals and virtual network messages (VNMs) can be transferred from one bus to another. In the example shown, three physical, on-board buses are shown: a high-speed bus 110, a low-speed bus 112 (such as vehicle bus 12 shown in FIGS. 1, 2, and 6), and a third-party bus 114 such as might be used in an industry-developed entertainment system. Also shown is a service tool 116 such as a diagnostic code scanner, and a remote network 118 which is accessed via satellite communications or otherwise. In the illustrated example, four gateways are utilized: gateway G1 which interfaces between the high- and low-speed buses 110, 112; gateway G2 which interfaces between the high-speed bus 110 and service tool 116; gateway G3 which interfaces between the low-speed bus 112 and third party bus 114; and gateway G4 which interfaces between the low-speed bus 112 and the remote network 118.

Figure 8:
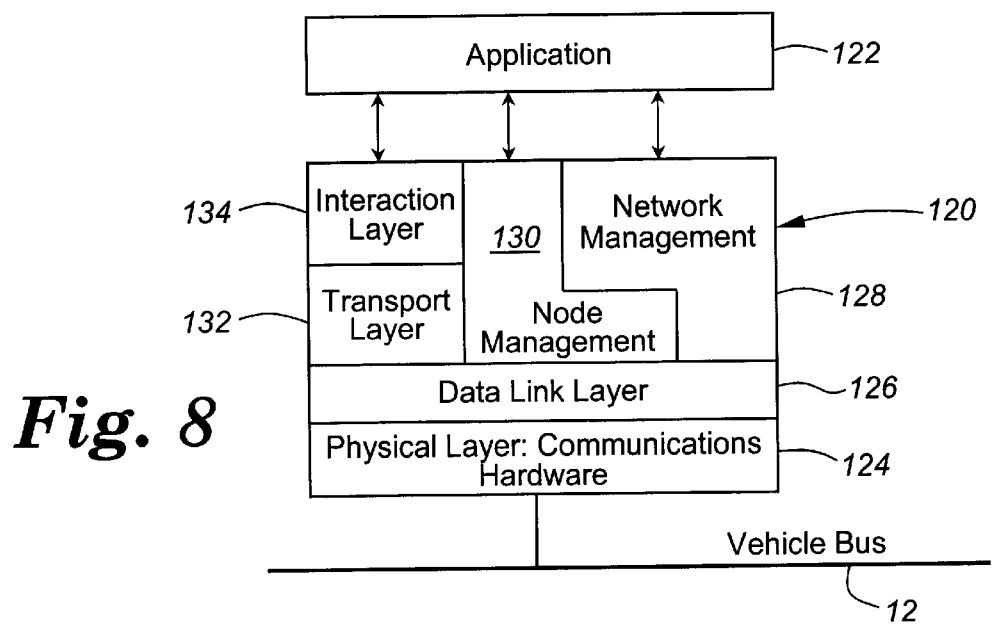
FIG. 8 is a conceptual model of a communication kernel used by an ECU to communicate over the network of FIG. 1.

FIG. 8 depicts a conceptual layout of a communication kernel 120 that can be used by each of the ECUs in communicating with its respective bus. This communication kernel provides a standardized interface between the bus and the application process 122 being executed by the ECU. It includes both software and physical layers. More specifically, the communication kernel 120 includes a physical layer 124 that provides a conversion of the digital data symbols (1's and 0's) generated by the data link layer 126 into electrical signals transmitted on the bus. The physical layer 124 includes such things as bus transceivers, filtering, and the physical wiring to connect the ECU to the bus. The data link layer 126 provides services for the transfer of individual frames between nodes (ECUs). It handles the protocol of the bus system (e.g., bit timing, arbitration, and error detection). The kernel includes a network management layer 128 that is used to control the start-up, shutdown, and error handling for the ECUs where these functions involve interaction among the ECUs and therefore have to be managed globally, and also includes a node management layer 130 that is used to control the start-up, shutdown, and error handling where these functions do not involve interaction with the other ECUs and therefore can be managed locally. The kernel 120 further includes a transport layer 132 that transfers data packets using services of the data link layer 126. It provides an unacknowledged transport service (1:N communication, 1:1 communication). If long messages have to be transferred over the network, the transport layer provides services for segmented data transfer. On the transmit side, the message is broken into segments, each segment being short enough to fit in a single network frame. On the receive side, individual segments are assembled into a message. The transport layer 132 also provides connect setup and flow control. Finally, the kernel 120 also includes an interaction layer 134 that serves as the application program interface. It provides communication services to the application 122 independent of the bus protocol and uses services of the transport layer 132 for communicating on the bus.

Figure 9:
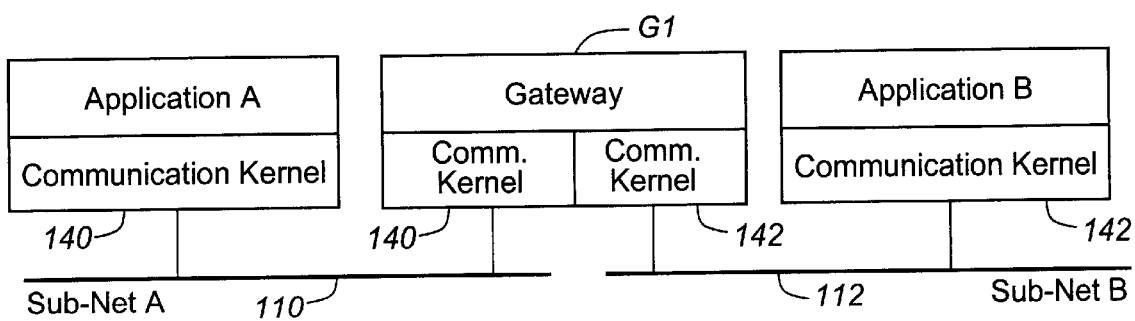
FIG. 9 is an overview block diagram showing how the gateways of FIG. 6 are used to provide communication between ECUs on different networks.

Despite the fact that the networks using buses 110 and 112 might each be designed so that the bulk of the signals will stay in their local network, some signals will have to be transferred outside the local network. This is true, for example, where a virtual network spans more than one physical bus. These messages are transferred between the buses using one of the gateways. As shown in FIG. 9, each gateway node is connected to at least 2 buses and will interact with each network according to its message strategy and transmission models. Thus, the gateway includes a separate communication kernel 140, 142 for each of the two networks. This gateway node normally carries out several application tasks where the gateway function is merely one of them. The gateway interacts with the bus kernels' interaction layers 134 and performs some or all of the following services: transfer of wake-up requests to other networks; transfer of virtual network information such as VNMs to other networks; transfer of signals between networks; support of signal parameter processing (event generation, data conversion, data filtering, etc.); and transfer of block information with USDT protocol.

On the low-speed sub-net 112, transmission speeds are low enough that VNM transmissions can generally be processed as they are received, i.e., on an "interrupt basis". As a result, the timing requirements are relatively simple. Continuing (follow-up) VNMs are transmitted every three seconds (when required) and initializing VNM transmissions can essentially be unrestricted. On the high-speed sub-net 110, the transmission speed is high enough that processor demand associated with uncontrolled bursts of VNMs may be unacceptable. To control these bursts, the ECUs can be programmed with a burst algorithm that periodically gives each ECU a time slot to transmit a single VNM. The burst algorithm is parameterized so it can be tuned to provide the appropriate trade-off between performance and VNM transmission timing. The burst avoidance can be implemented as follows. Contained in the least significant six bits of the VNM Frame ID of FIG. 5 is an ECU ID that uniquely identifies the transmitting node of that VNM. The two most significant bits of this ECU identifier are used to identify the sub-net on which the ECU is located (e.g., the high-speed sub-net 110 versus the low-speed sub-net 112). The four least significant bits are used as a VNM transmission sequence number (0 to 15). Using this sequence number, devices can calculate their VNM transmission intervals in a manner that avoids bursts. Thus, for the high speed bus 110, the ECU ID not only uniquely identifies the ECU, but also is used to determine the ECU's time slot for sending VNMs.

The following constants are used in the burst avoidance algorithm:

| Symbol | Tentative Value | Meaning |
| --- | --- | --- |
| w | platform dependent | Wake up delay time - - the maximum allowed time between transmitting/receiving the common wake-up request trigger and completing activation of the communication kernel. |
| I | 3 sec | required VNM transmission interval |
| N | device dependent | the node's sequence number. |
| s | 20 msec | required VNM transmission slot width |
| $s_1$ | 150 msec | VNM initialization slot width - the maximum time allowed for transmitting the initial VNM before taking corrective action (error recovery). |

The VNM transmission slot width s is chosen so as to equally space the transmissions from sixteen separate nodes within the VNM transmission interval i. The VNM initialization slot width $s_i$ must be greater than w and must allow for transmit delays (queuing) and receive delays (polling). These constraints can be expressed as:

$$s_i > w + q + p,$$

where q is the queuing delay tolerance and p is the maximum polling time.

The following variables are used:

| Variable | Meaning |
| --- | --- |
| V | VNM transmit timer. This timer counts down from the required interval time to zero. When V = 0 the ECU's VNM transmission slot opens. |
| $N_r$ | the ECU ID from the received VNM |

The following algorithm can be implemented on each node on the high-speed subnet that is required to transmit a VNM. Upon detecting a wake-up request signal, if the ECU is in the quiescent mode, it switches to its activated state within time w, initializes the communication kernel, and sets the VNM transmit timer to $V=w+n*s_i$. If the ECU is already awake, then the VNM transmit timer is reinitialized to $V=w+n*s_i$. Upon receipt of each VNM, each ECU recalculates the wait time V for transmitting its VNM based on the received ECU ID $n_r$ and its own ECU ID n. Where $n<n_r$, the transmit wait time is calculated as $V=i-(n_r-n)*s$. Where $n>n_r$, the transmit wait time is calculated as $V=(n_r-n)*s$.

If an ECU needs to start a virtual network, and wake-ups are inhibited, then the responsiveness of the activation process will be limited by the time it takes for the ECU to obtain an open transmission slot. In the worst case this is (i−s). If wake-ups are not inhibited then the responsiveness is limited by how quickly the ECU can transmit the wake-up and how long the ECU must wait for its slot to open. This depends on which ECU is the first to transmit a VNM, but if the ECU with slot 1 is the first transmitter, then the delay is $w+s_i+(n-1)*s$, or approximately $2*w+n*s$, where n is the ECU's sequence number. In the case where wake-ups are inhibited, worst case performance can be improved by choosing a smaller value for i. Since there are sixteen ECUs allowed, the smallest value that can be used is i=16*s. This corresponds to constantly rotating through the slots, with one ECU slot open at a time, all of the time. The worst case delay to transmitting an initializing VNM in this case (wake-ups inhibited) is then 15*s. In the case where the wake-ups are not inhibited, the delay can be minimized if the ECU with sequence number 1 always transmits a VNM, so the ECU with sequence number 1 should be chosen carefully. Assuming that the ECU with sequence number 1 always transmits, then the only other optimization that can be performed is to reduce w, the worst case initialization time.

There are various circumstances under which the ECUs are reset. For example, a reset occurs on each power-up, with the ECUs then initializing their communication kernels. When in their low power quiescent state, each ECU is able at a minimum to detect changes on its inputs and, in particular, to detect wake-up requests and VNMs. Upon receiving either of these, the ECUs initiate their communication kernels if not already active. This is done by the ECU as a part of its switching from a quiescent state to an activated state. Each time the communication kernel is initialized, it stays active for a minimum of eight seconds to monitor for messages and, as discussed above, if one is received for a virtual network of which the ECU is a member, then the eight seconds are restarted, with this process continuing until no more VNMs are received.

By activating the communication kernel for eight seconds following each reset, the system provides a predictable recovery from error conditions such as a "running" ECU reset. If an ECU experiences a power failure (e.g., intermittent power line), or experiences a running ECU reset, it can rejoin any active virtual networks once the ECU is powered. This is accomplished by programming the ECUs such that, when they power up and detect (by way of receipt of a continuing (follow-up) VNM) that a virtual network of which they are a part is currently in process, they request that the virtual network be re-initialized. Thus, following power up or a reset, the ECU starts its communication kernel and keeps it active for eight seconds. During this time interval, the ECU monitors received VNMs to determine if any virtual networks that it supports are active. If it detects an active virtual network that it supports, it then requests that the virtual network be re-initialized. The ECU also resumes its support of the virtual network. At this point the ECU is re-integrated into the virtual network. In a similar manner, an ECU can recover if any transient communication failure results in an individual virtual network being inactive on the ECU while it is active for other ECUs. Any time the application suspects that communication may have failed, it can either start the communication kernel or inhibit the shut down of the communication kernel. With the communication kernel active, the ECU can re-join any active virtual networks using the same process described above for an ECU reset.

When a virtual network is started, the participating ECUs each begin supervising the sources of the signals that they are receiving. Each ECU in the virtual network can be configured to periodically broadcast one or more signals that serve as its "heartbeat". ECUs then monitor the heartbeats of the other ECUs in the virtual network so they can notify the application if one of the information sources fails. If an information source fails, the associated application can be notified and a diagnostic trouble code is set. The application can then take application-specific actions, as necessary.

As described above, a virtual network is activated by transmission of an initial VNM which contains a code identifying the virtual network. Where the time delays associated with starting up the virtual network must be minimized, then the virtual network can be configured (on all of the ECUs within that virtual network) to be "initially active". For these virtual networks, the ECUs treat a bus wake-up broadcast as both a wake-up which starts the communication kernel and a VNM that initializes the virtual network. The start up time is reduced by not having to wait for the VNM transmission that initializes the virtual network. The process of keeping the virtual network active and the process of shutting it down is still based on VNM transmissions as discussed above in connection with FIGS. 1, 2, and 6.

In those instances where all of the ECUs on a particular virtual network share the same input that is used to initiate the control operation for the virtual network, the ECUs in that virtual network can be configured to each activate their communication kernels in response to a trigger signal (change in state) on that shared input. This is thus another manner in which a virtual network can be activated without the use of VNMs or wake-up signals. Moreover, for this arrangement, deactivation of the virtual network need not be based on a time-out by a timer, but can occur immediately when requested to do so by the application, often as a result of the shared input again changing states. The activation of a virtual network using shared inputs is simpler than that of one activated using VNMs because the bus is not used in the activation process. The price of this simplicity is that all of the ECUs must share the inputs necessary to detect when the virtual network is to be activated. When this is a natural byproduct of the vehicle's architecture, it can be easily exploited, but otherwise it is generally not economically desirable to introduce wiring to reduce virtual network activation overhead.

When an ECU's voltage level drops sufficiently, it may not be able to transmit or receive reliably. While little can be done to avoid this without additional hardware support, a relatively transparent recovery from the occurrence can be made under certain circumstances. Generally, low-voltage conditions cannot be predicted. However, during certain pre-defined vehicle situations it is known that voltage drops are more likely to occur. If ECUs are provided prior notification of the event, then they can take preventative measures that, while not preventing erroneous message transmissions, can be used to facilitate a rapid, transparent recovery. Upon notification, these ECUs put themselves in a low-voltage tolerant mode that keeps them from being deactivated due to the inability to transmit VNMs. Following the event, virtual networks that are deemed to be low-voltage susceptible are re-initialized so that ECUs in the virtual network re-establish a common view of the shared signal values. This low-voltage tolerant mode can be invoked and terminated via the communication kernel and, if support for this mode is included on any one ECU within a virtual network, then it should be included on all other ECUs within that virtual network.

When prior knowledge of a low-voltage condition is available to all ECUs in a virtual network, preventive measures can be taken. Upon reception of specific signal values indicating that the low-voltage condition is imminent, applications on ECUs configured to support the low-voltage tolerance mode can invoke this procedure. Since ECUs may be asleep when the entry signal is transmitted, it is possible that they may wake up while the low-voltage condition is present. Consequently, these ECUs have to assume that a low-voltage condition is present every time they initialize their communication kernel. In other words, since communication is not reliable during the low-voltage condition, ECUs that wake up during the condition cannot wait for signal transmissions to determine whether low-voltage tolerant operation is in progress. They are therefore programmed to default to the low-voltage tolerant mode.

The ECU that broadcasts the low-voltage tolerant mode signal broadcasts the mode entry (or start) signal when it detects that the low-voltage condition is about to occur. In order to synchronize entry to the low-voltage tolerant mode, the master ECU has to react to its own entry and exit signal transmissions in the same way (and at the same time) as ECUs receiving these signals. ECUs that are awake at the time of the entry signal broadcast react to this signal value by halting several timers that cannot be reliably maintained while the low-voltage conditions is present. If these ECUs subsequently start other virtual networks during the low-voltage condition, the corresponding timers are initialized to their normal start up values and then halted. ECUs that support the low-voltage tolerant mode and which wake up during the low-voltage condition will default to the low-voltage tolerant mode and behave as if they had received the entry signal. When the low-voltage tolerant mode master ECU detects that the low-voltage condition is no longer present, it broadcasts the exit signal, which can simply be a different value of the same signal used to initiate the low-voltage tolerance mode. Upon receipt of the exit signal, ECUs resume normal processing. In addition, each ECU maintains a list of virtual networks that it considers low-voltage susceptible. When the exit signal is received, any ECU that is currently the master of a virtual network in its low-voltage susceptible list requests that the virtual network be initialized (by transmitting an initializing VNM). This is done to re-establish a common view of the virtual network's signal values, since some transmissions may have been missed during the low-voltage condition.

All ECUs supporting the low-voltage tolerant mode include the entry and exit signals in all virtual networks that they support. This guarantees that regardless of which virtual networks they are actively supporting, they will receive the exit signal if they are awake at the time it is broadcast. For the sake of ECUs that may have gone to sleep during the low-voltage condition, the master must also make sure that all quiescent ECUs are awakened and the exit signal rebroadcast. To accomplish this, the master's application activates a separate virtual network which includes a broadcast of the exit signal as part of its initialization and which is known to be common to all ECUs supporting low-voltage tolerant operation. A virtual network dedicated to this function can be provided if necessary. To cover the possibility that this low-voltage tolerant mode virtual network may already be active, all ECUs that implement the low-voltage tolerant mode are programmed to include the low-voltage tolerant mode virtual network in their low-voltage susceptible list. This ensures that initialization of the low-voltage tolerant mode virtual network and the subsequent rebroadcast of the exit signal will occur regardless of whether or not the low-voltage tolerant mode virtual network is active when the low-voltage condition ends.

It should thus be apparent that there has been provided in accordance with the present invention a method and apparatus for in-vehicle network management using virtual networks which achieves the aims and advantages specified herein. It will of course be understood that the foregoing description is of preferred exemplary embodiments and that the invention is not limited to the specific embodiments shown. Various changes and modifications will become apparent to those skilled in the art. For example, although the use of a high-voltage wake-up has been described in connection with the illustrated embodiment, it will be understood that any of a number of other wake-up techniques could be employed, such as by use of a separate signal sent to each ECU over a dedicated wire. Optionally, where the ECUs are capable of waking up based on a code contained in the header of a network message, the wake-up could be accomplished without the use of a high-voltage signal or dedicated line and could even be combined with the VNM itself so that only a single message need be sent to both wake-up the ECUs and provide them with the initializing VNM. All such changes and modifications are intended to come within the scope of the appended claims.

What is claimed is:

1. An on-board vehicle network, comprising:
   a plurality of on-board vehicle electronic control units (ECUs) connected together via at least one network bus that permits communication between said ECUs;
   a first virtual network comprising a first group of said ECUs, wherein said first group of said ECUs are operable together to perform a first control task and are each identified using a first code that is associated with said first virtual network; and
   a second virtual network comprising a second group of said ECUs, wherein said second group of said ECUs are operable together to perform a second control task and are each identified using a second code that is associated with said second virtual network;
   wherein said ECUs of said first and second virtual networks are connected to said network bus to receive first and second messages, with said ECUs of said first virtual network being responsive to said first message to perform said first control task and said ECUs of said second virtual network being responsive to said second message to perform said second control task;
   wherein a first one of said ECUs is connected to said network bus to receive a first signal requesting activation of said first virtual network and is operable in response to said first signal to periodically generate said first message until said first control task is completed; and
   wherein a second one of said ECUs is connected to said network bus to receive a second signal requesting activation of said second virtual network and is operable in response to said second signal to periodically generate said second message until said second control task is completed.

2. An on-board vehicle network as defined in claim 1, wherein said first message includes said first code.

3. An on-board vehicle network as defined in claim 2, wherein said first code comprises a bit located in a selected position within said first message.

4. An on-board vehicle network as defined in claim 3, wherein said first message includes a plurality of different bit positions, each of which corresponds to a different virtual network and each of which can be set or cleared to indicate whether its associated virtual network is active or inactive.

5. An on-board vehicle network as defined in claim 2, wherein said first one of said ECUs is in said first virtual network and wherein said first message further includes data that identifies said one ECU.

6. An on-board vehicle network as defined in claim 1, wherein said first one of said ECUs is operable to generate said first message within a first time slot and wherein said second one of said ECUs is operable to generate another message within a second time slot that is different than said first time slot.

7. An on-board vehicle network as defined in claim 6, wherein said first and second messages comprise virtual network messages and wherein each ECU on said network bus is assigned a unique ID that is used to determine a time slot for that ECU, with each said ECU using its associated time slot for transmissions of said virtual network messages.

8. An on-board vehicle network as defined in claim 7, wherein the number of time slots is less than the number of ECUs on the network bus, whereby at least some of said ECUs use a time slot that is the same as others of said ECUs.

9. An on-board vehicle network as defined in claim 1, wherein said first code is the same for all of the ECUs in said first virtual network.

10. An on-board vehicle network as defined in claim 1, wherein said first and second codes each comprise a code that uniquely identifies its associated virtual network from all other virtual networks connected to said vehicle bus.

11. An on-board vehicle network as defined in claim 1, wherein at least one of said ECUs is a multiple task ECU that is included in both said first and second groups, whereby said multiple task ECU comprises a part of both said first and second virtual networks.

12. An on-board vehicle network as defined in claim 1, further including a third virtual network comprising a third group of said ECUs, wherein said third group of said ECUs are operable together to perform a third control task and are each identified using a third code that is associated with said third virtual network.

13. An on-board vehicle network as defined in claim 1, wherein one or more of said ECUs are operable in both an active state and a low power quiescent state and are operable to switch from said quiescent state to said active state in response to a wake-up signal sent by another of said ECUs.

14. An on-board vehicle network as defined in claim 13, wherein said first one of said ECUs is operable to generate said wake-up signal and to thereafter generate said first message.

15. An on-board vehicle network as defined in claim 14, wherein, following switching from said low power quiescent state to said active state, each of said one or more ECUs are operable to monitor for one of said messages and are operable to return to said low power quiescent state if no message is received identifying a virtual network containing the ECU.

16. An on-board vehicle network as defined in claim 1, wherein said first virtual network includes only those ECUs used in carrying out said first control task.

17. An on-board vehicle network as defined in claim 1, wherein said ECUs within said first group are operable upon reset to perform the first control task.

18. An on-board vehicle network as defined in claim 1, wherein said first message is transmitted over said network bus at a regular interval until said first control task is complete and wherein the ECUs in said first virtual network are operable to monitor said network bus for a predetermined amount of time following receipt of each first message, with said predetermined amount of time being greater than said interval.

19. An on-board vehicle network as defined in claim 1, wherein said first message includes at least one bit that distinguishes an initial transmission of said first message from subsequent transmissions of said first message.

20. An on-board vehicle network as defined in claim 1, wherein said first virtual network is activated as a result of said first message and wherein each of said ECUs of said first group are operable following a reset and upon receiving one of the subsequent transmissions of the first message to send a message over said network bus that re-initializes said first virtual network.

21. An on-board vehicle network as defined in claim 1, further comprising a second network bus connected to said one network bus via a gateway, wherein said gateway is operable to transmit said first message to said second network bus.

22. An on-board vehicle network as defined in claim 21, wherein said first message includes an sub-net ID identifying said one network bus.

23. A method of managing an on-board vehicle network of electronic control units (ECUs), wherein at least some of the ECUs are operable in both an active state and a low power quiescent state and wherein the network includes at least one subset of the ECUs that are operable together to perform a particular control task, the method comprising the steps of:

(a) receiving a signal request for activating a control task;

(b) waking up the ECUs out of the low power quiescent state;

(c) sending a message to the ECUs that includes a code associated with the control task;

(d) wherein each of a number of the ECUs perform the steps of:
 (d1) receiving the message and,
 (d2) if the code included with the message corresponds to a control task associated with the ECU, then operating in an active state in which the ECU is operable to perform the control task together with other ECUs associated with the control task; and
 (d3) if the code included with the message does not correspond to a control task associated with the ECU, then entering into the low power quiescent state.

24. The method of claim 23, wherein:

step (a) further comprises having one of the ECUs receive the signal request;

step (b) further comprises having that one ECU send out a wake-up signal to other ECUs on the network; and step (c) further comprises having that one ECU send the message to other ECUs on the network.

25. The method of claim 24, wherein the message includes data that uniquely identifies that one ECU.

26. The method of claim 23, wherein the code identifies a virtual network that includes the ECUs associated with the control task to which the code corresponds.

27. The method of claim 23, wherein step (c) further comprises sending a message having a code for each of a plurality of control tasks.

28. The method of claim 27, wherein each of the codes within the message comprise a bit located in a different position within the message, whereby each of the plurality of control tasks is associated with one of the bits within the message.

29. The method of claim 23, wherein step (b) further comprises, for each of a number of the ECUs, waiting a period of time for receipt of the message and, in the absence of receipt of that message, entering into the low power quiescent state following elapse of the period of time.

30. The method of claim 23, wherein step (c) further comprises periodically sending a follow-up message to the ECUs, wherein said follow-up messages including the code.

31. The method of claim 30, wherein, for those ECUs associated with the code contained in the messages, the method further comprises the steps of:

waiting a period of time for receipt of one of the messages;

entering into the low power quiescent state if none of the messages is received within a selected period of time; and if one of the messages is received within the selected period of time, then continuing in the active state and repeating said waiting, entering, and continuing steps.

32. The method of claim 31, further comprising the step of resetting a timer following receipt of each of the messages and entering the low power quiescent state upon expiration of the timer.

33. The method of claim 32, further comprising the steps of receiving a signal indicative of a low-voltage condition and halting operation of the timer until the low-voltage condition is no longer indicated.

34. A method of operating an electronic control unit (ECU) that is included within an on-board vehicle network of ECUs, comprising the steps of:

(a) operating in a low-power quiescent state;

(b) receiving a wake-up signal via the network;

(c) switching to an active state in response to the wake-up signal;

(d) monitoring the network for receipt of a code indicative of a control task to be carried out using a number of the ECUs on the network;

(e) switching back to the quiescent state if no code is received within a period of time following the wake-up signal; and (f) if a code is received within the period of time, then performing the steps of:

(f1) determining whether the ECU is associated with the code;

(f2) if so, enabling operation of the ECU to support carrying out the control task; and (f3) if not, switching back to the quiescent state.

* * * * *